United States Patent
Rao et al.

(10) Patent No.: US 7,665,127 B1
(45) Date of Patent: Feb. 16, 2010

(54) SYSTEM AND METHOD FOR PROVIDING ACCESS TO PROTECTED SERVICES

(75) Inventors: Srinivasan N. Rao, Newark, NJ (US); Lioun Chen, Edison, NJ (US)

(73) Assignee: JP Morgan Chase Bank, New York, NY (US)

( * ) Notice: Subject to any disclaimer, the term of this patent is extended or adjusted under 35 U.S.C. 154(b) by 682 days.

(21) Appl. No.: 11/052,677

(22) Filed: Feb. 7, 2005

Related U.S. Application Data

(60) Provisional application No. 60/584,234, filed on Jun. 30, 2004.

(51) Int. Cl.
*G06F 7/04* (2006.01)

(52) U.S. Cl. .............................. 726/9; 726/20

(58) Field of Classification Search ............... 726/7–10; 713/165, 167, 171, 172, 185; 709/225, 229
See application file for complete search history.

(56) References Cited

U.S. PATENT DOCUMENTS

| | | | |
|---|---|---|---|
| 4,751,702 A | 6/1988 | Beier et al. |
| 5,027,269 A | 6/1991 | Grant et al. |
| 5,075,881 A | 12/1991 | Blomberg et al. |
| 5,313,616 A | 5/1994 | Cline et al. |
| 5,347,518 A | 9/1994 | Lee |
| 5,386,551 A | 1/1995 | Chikira et al. |
| 5,446,895 A | 8/1995 | White et al. |
| 5,539,885 A | 7/1996 | Ono et al. |
| 5,549,117 A | 8/1996 | Tacklind et al. |
| 5,563,998 A | 10/1996 | Yakich et al. |
| 5,566,297 A | 10/1996 | Devarakonda |
| 5,594,863 A | 1/1997 | Stiles |
| 5,630,047 A | 5/1997 | Wang |
| 5,630,069 A | 5/1997 | Flores et al. |
| 5,655,074 A | 8/1997 | Rauscher |
| 5,701,471 A | 12/1997 | Subramanyam |
| 5,712,971 A | 1/1998 | Stanfill et al. |
| 5,721,913 A | 2/1998 | Ackroff et al. |
| 5,721,914 A | 2/1998 | DeVries |
| 5,748,878 A | 5/1998 | Rees et al. |
| 5,752,034 A | 5/1998 | Srivastava |
| 5,758,061 A | 5/1998 | Plum |
| 5,768,506 A | 6/1998 | Randell |

(Continued)

FOREIGN PATENT DOCUMENTS

WO     01/74043     10/2001

OTHER PUBLICATIONS

Hilbert; Hilbert, et al., An Approach to Large Scale Collection of Application Usage Data Over the Internet, Software Engineering 1998, Proceedings of the 1998 International Conference, Abstract, Apr. 1998.

(Continued)

*Primary Examiner*—Beemnet W Dada
(74) *Attorney, Agent, or Firm*—Lowenstein Sandler PC

(57) ABSTRACT

A method and a system for allowing computer-executable applications to efficiently and securely obtain credentials required to access data from a protected Web service utilizes an ID token. The ID token is associated with an IP address of a user's computer, and is validated before providing the credentials to the user's computer.

25 Claims, 2 Drawing Sheets

U.S. PATENT DOCUMENTS

| | | | |
|---|---|---|---|
| 5,781,448 | A | 7/1998 | Nakamura et al. |
| 5,784,562 | A | 7/1998 | Diener |
| 5,799,297 | A | 8/1998 | Goodridge et al. |
| 5,806,075 | A | 9/1998 | Jain et al. |
| 5,828,883 | A | 10/1998 | Hall |
| 5,835,770 | A | 11/1998 | Shum et al. |
| 5,842,196 | A | 11/1998 | Agarwal et al. |
| 5,845,292 | A | 12/1998 | Bohannon et al. |
| 5,872,976 | A | 2/1999 | Yee et al. |
| 5,884,037 | A | 3/1999 | Aras et al. |
| 5,903,721 | A | 5/1999 | Sixtus |
| 5,903,897 | A | 5/1999 | Carrier, III et al. |
| 5,920,719 | A | 7/1999 | Sutton et al. |
| 5,937,198 | A | 8/1999 | Nelson et al. |
| 5,960,196 | A | 9/1999 | Carrier, III et al. |
| 5,960,445 | A | 9/1999 | Tamori et al. |
| 5,995,965 | A | 11/1999 | Experton |
| 6,003,075 | A | 12/1999 | Arendt et al. |
| 6,009,274 | A | 12/1999 | Fletcher et al. |
| 6,026,237 | A | 2/2000 | Berry et al. |
| 6,028,938 | A | 2/2000 | Malkin et al. |
| 6,029,002 | A | 2/2000 | Afifi et al. |
| 6,058,393 | A | 5/2000 | Meier et al. |
| 6,061,503 | A | 5/2000 | Chamberlain |
| 6,061,686 | A | 5/2000 | Gauvin et al. |
| 6,067,412 | A | 5/2000 | Blake et al. |
| 6,073,107 | A | 6/2000 | Minkiewicz et al. |
| 6,088,700 | A | 7/2000 | Larsen et al. |
| 6,101,601 | A | 8/2000 | Matthews et al. |
| 6,108,673 | A | 8/2000 | Brandt et al. |
| 6,125,390 | A | 9/2000 | Touboul |
| 6,128,708 | A | 10/2000 | Fitzpatrick et al. |
| 6,138,112 | A | 10/2000 | Slutz |
| 6,145,121 | A | 11/2000 | Levy et al. |
| 6,167,534 | A | 12/2000 | Straathof et al. |
| 6,175,833 | B1 | 1/2001 | West et al. |
| 6,195,676 | B1 | 2/2001 | Spix et al. |
| 6,226,752 | B1 * | 5/2001 | Gupta et al. ................. 726/9 |
| 6,230,319 | B1 | 5/2001 | Britt, Jr. et al. |
| 6,237,035 | B1 | 5/2001 | Himmel et al. |
| 6,237,143 | B1 | 5/2001 | Fontana et al. |
| 6,243,862 | B1 | 6/2001 | Lebow |
| 6,247,029 | B1 | 6/2001 | Kelley et al. |
| 6,249,877 | B1 | 6/2001 | Kawakami et al. |
| 6,269,479 | B1 | 7/2001 | Puram |
| 6,279,039 | B1 | 8/2001 | Bhat et al. |
| 6,301,701 | B1 | 10/2001 | Walker et al. |
| 6,311,327 | B1 | 10/2001 | O'Brien et al. |
| 6,338,138 | B1 * | 1/2002 | Raduchel et al. ............ 713/155 |
| 6,363,499 | B1 | 3/2002 | Delo et al. |
| 6,363,524 | B1 | 3/2002 | Loy |
| 6,405,250 | B1 | 6/2002 | Lin et al. |
| 6,405,364 | B1 | 6/2002 | Bowman-Amuah |
| 6,411,910 | B1 | 6/2002 | Eulau et al. |
| 6,424,981 | B1 | 7/2002 | Isaac et al. |
| 6,438,749 | B1 | 8/2002 | Chamberlain |
| 6,446,126 | B1 | 9/2002 | Huang et al. |
| 6,463,454 | B1 | 10/2002 | Lumelsky et al. |
| 6,466,980 | B1 | 10/2002 | Lumelsky et al. |
| 6,467,052 | B1 | 10/2002 | Kaler et al. |
| 6,470,464 | B2 | 10/2002 | Bertram et al. |
| 6,477,471 | B1 | 11/2002 | Hedstrom et al. |
| 6,502,207 | B1 | 12/2002 | Itoh et al. |
| 6,505,176 | B2 | 1/2003 | DeFrancesco, Jr. et al. |
| 6,513,154 | B1 | 1/2003 | Porterfield |
| 6,519,763 | B1 | 2/2003 | Kaufer et al. |
| 6,526,443 | B1 | 2/2003 | Goldsmith et al. |
| 6,546,506 | B1 | 4/2003 | Lewis |
| 6,560,580 | B1 | 5/2003 | Fraser et al. |
| 6,578,004 | B1 | 6/2003 | Cimral et al. |
| 6,578,006 | B1 | 6/2003 | Saito et al. |
| 6,584,447 | B1 | 6/2003 | Fox et al. |
| 6,587,841 | B1 | 7/2003 | DeFrancesco et al. |
| 6,601,017 | B1 | 7/2003 | Kennedy et al. |
| 6,601,018 | B1 | 7/2003 | Logan |
| 6,601,233 | B1 | 7/2003 | Underwood |
| 6,626,953 | B2 | 9/2003 | Johndrew et al. |
| 6,629,266 | B1 | 9/2003 | Harper et al. |
| 6,820,088 | B1 | 11/2004 | Hind et al. |
| 6,920,467 | B1 | 7/2005 | Yoshimoto |
| 6,934,934 | B1 | 8/2005 | Osborne, II et al. |
| 7,185,364 | B2 * | 2/2007 | Knouse et al. ................. 726/8 |
| 7,509,672 | B1 * | 3/2009 | Horwitz et al. ................. 726/8 |
| 2002/0004912 | A1 | 1/2002 | Fung |
| 2002/0133593 | A1 | 9/2002 | Johnson et al. |
| 2002/0133757 | A1 | 9/2002 | Bertram et al. |
| 2002/0138571 | A1 | 9/2002 | Trinon et al. |
| 2002/0143929 | A1 | 10/2002 | Maltz et al. |
| 2002/0147961 | A1 | 10/2002 | Charters et al. |
| 2002/0162090 | A1 | 10/2002 | Parnell et al. |
| 2002/0165754 | A1 | 11/2002 | Tang et al. |
| 2003/0004848 | A1 | 1/2003 | Hellerstein et al. |
| 2003/0018952 | A1 | 1/2003 | Roetzheim |
| 2003/0033586 | A1 | 2/2003 | Lawler |
| 2003/0041000 | A1 | 2/2003 | Zajac et al. |
| 2003/0065644 | A1 | 4/2003 | Horman et al. |
| 2003/0120539 | A1 | 6/2003 | Korium et al. |
| 2003/0144868 | A1 | 7/2003 | MacIntyre et al. |
| 2003/0188290 | A1 | 10/2003 | Corral |
| 2003/0196190 | A1 | 10/2003 | Ruffolo et al. |
| 2003/0212518 | A1 | 11/2003 | D'Alessandro et al. |
| 2003/0225662 | A1 | 12/2003 | Horan et al. |
| 2003/0225663 | A1 | 12/2003 | Horan et al. |
| 2005/0055555 | A1 * | 3/2005 | Rao et al. ................... 713/182 |
| 2005/0071807 | A1 | 3/2005 | Yanai |
| 2006/0101114 | A1 * | 5/2006 | Sandhu et al. ............... 709/203 |

OTHER PUBLICATIONS

Quantitative Monitoring of Software Development by Time-Based and Intercheckpoint Monitoring, Software Engineering Journal, vol. 5, Iss. 1, p. 43-49, Abstract, Jan. 1990.

Sammet; Beginning of 4.6 Software Evaluation, Tests and Measurements and RMF I/O Time Validation, Association of Computing Machinery, p. 519.

Duggan; 2.40 General—Reviews and Abstracts, SPI Database of Software Technologies, p. 1-5, Feb. 1, 1974.

Agostini et al.; A Light Workflow Management System Using Simple Process Models, Cooperation Technologies Laboratory, Disco-University of Milano-Bicoca, Aug. 2000.

Muehlen; Business Process Automation and Workflow in the Financial Industry, CSK Software AG, Version 3, p. 1-37, September 10, 2003.

Georgakopoulos et al.; An Overview of Workflow Management: From Process Modeling to Workflow Automation Infrastructure, Kluwer Academic Publishers, Boston, Distributed Parallel Databases, vol. 3, p. 119-153, 1995.

OS/2EE Database Manager SQLJRA Remote Protocol, IBM Corporation, IBM TDB N10-93, p. 33-36, Jan. 1, 1993.

Code Generation for Database Applications, IBM Corporation, p. 1-3, Mar. 1, 2002.

Hudeponhl et al.; Integrating Metrics and Models for Software Risk Assessment, The Seventh International Symposium on Software Reliability Engineering (ISSRE '96), p. 93, Oct. 30, 1996.

Wohlin et al.; Understanding the Sources of Software Defects: A Filtering Approach, 8th International Workshop on Program Comprehension (IWPC '00), p. 9, (Abstract), Jun. 10, 2000.

Mohapatra et al.; Defect Prevention Through Defect Prediction: A Case Study at INFOSYS.

Basili et al.; Understanding and Predicting the Process of Software Maintenance Releases, 18th International Conference on Software Engineering (ICSE '96), Mar. 25-29; p. 464; (Abstract).

Betwixt: Turning Beans Into XML, Apache Software Foundation, Archived Jun. 20, 2002 at <http://web.archive.org/web/20020620000410/http://jakarta.apahce.org.commons/betwixt/>, p. 1 of 1, Nov. 13, 2005.

Castor: Using Castor XML, Exolab Group, Archived Aug. 27, 2001 at <http://web.archive.org/web/20011019155934/http://www.castor.org/xml-framework.html>, Retrieved From the Internet on Nov. 11, 2005.

Campione, et al.; Special Edition Using Java Tutorial, Third Edition: A Short Course on the Basics, Addison Wesley Professional ISBN: 0201-70393-9, 21 pages From Chapter 5, December 28, 2000.

Pitt and McNiff; Java, RMI: The Remote Method Inovocation Guide, Addison Wesley Professional, ISBN: 0201-70043-3, Section 3.5, 3 Pages.

Hamilton; Javabeans, Sun Microsystems, Chapter 8, Aug. 8, 1997.

Reinhart; Liability Management: A New Tool for Financial Consultants, Financial Consultant, vol. 1, No. 3, p. 7-11, Fall/Winter 1996, ISSN 1091-644X, Dialog File 15, Accession No. 01395382.

McConnell; Gauging Software Readiness With Defect Tracking; IEEE; May/Jun. 1997.

Programmer'S Guide; Monitor Client Library 12.5; Document ID 32865:01-1250-01.

Yu, et al.; An Analysis of Several Software Defect Models; IEEE Transactions on Software Engineering, vol. 14., No. 9; Sep. 1988.

* cited by examiner

SYSTEM AND METHOD FOR PROVIDING ACCESS TO PROTECTED SERVICES

CROSS-REFERENCE TO RELATED APPLICATION

This application claims the benefit of U.S. Provisional Application No. 60/584,234, filed Jun. 30, 2004, the entire disclosure of which is incorporated herein by reference.

FIELD OF THE INVENTION

The present invention relates to a system and method for providing access to a protected Web service, such that a plurality of requests for application data may be submitted without having to re-authenticate each request.

BACKGROUND OF THE INVENTION

The use of many conventional computer-executable applications often requires the applications to obtain data from protected Web services. A "protected Web service" involves a computer located on a web-based network, such as the Internet, which requires the authentication and validation of a user's identity prior to permitting access to data stored on the computer. Exemplary applications that require this type of repeated data acquisition include, but are not limited to, spreadsheet applications, such as Microsoft® Excel; word processing applications, such as Microsoft® Word or Corel WordPerfect®; database applications, such as Microsoft® Access; and presentation applications, such as Microsoft® PowerPoint. For example, these applications may require access to application data that includes, but is not limited to, logical expressions, equations, dates, numbers, characters and/or any information suitable for incorporation into or use by the application.

Often, the application data sought by the user is dynamic, and use of the application requires repeated requests for access to this changing data. Take, for example, the case where the application is a spreadsheet application having a number of equations embedded within the spreadsheet, each having variables representing source data stored on an application server. In the event the source data and/or equations change, these changes must be communicated to the spreadsheet for incorporation therein, often for a large number of users. Effectuating this type of universal change to the application is cumbersome and difficult when done on an individual user basis.

To alleviate problems associated with the distribution and management of applications and changes to application data, the applications and the application data may be stored on a central computer, known in the art as an "application server." Typically, the application server is accessible by users through a Web browser via a conventional computer network using any known Web-based protocol.

Although housing an application and application data on an application server allows for efficient control and distribution of the application and the application data, providing the application to users via a computer network introduces a number of security-related risks and problems. As such, access to the application server must be monitored to prevent access by unauthorized users. In order for a user to access the application server, which houses a desired application file, the user must first be authenticated. Typically, the user is authenticated by providing authenticating information, such as a username and a passcode, which is verified by a known authentication system.

Conventional systems require the re-authentication of a user each time a request for data is made. However, re-authenticating the user for each request is problematic for an application that requires frequent and repeated exchanges between the application and the application server. For example, an application that imports real-time data must access the application server at frequent periodic intervals, forcing the user to respond to numerous prompts for his or her authenticating information. These incessant interruptions distract the user from his or her intended purpose, leading directly to a decrease in productivity. Accordingly, there is a need in the art for a method and a system that allows a user to access an application and/or application data stored for a protected Web service.

SUMMARY OF THE INVENTION

The present invention relates to a system and a method that enables a computer-executable application to efficiently and securely obtain credentials required to request and access data from a protected Web service without having to re-authenticate the user for each request. Access to contents of the protected Web service, or application server, is protected by a credential validation system. A secure link between an application and the application server is established using a one-time authentication of the user and an authentication of the application itself.

According to an embodiment of the invention, an authenticated user's request for an application is transmitted with validated credentials and other request information (e.g., user IP address, time stamp) to an application server. The application server generates a unique identification (ID) token and links the ID token with the application.

The application server also associates the ID token, the user's authentication credentials, and other request information, and stores this association in a computer-readable memory communicatively connected to the application server.

The requested application and associated ID token are sent to the user for execution (i.e., opening or downloading). Upon execution of the application, the ID token is extracted from the application and sent back to the application server as a request for the credentials. The application server uses the ID token to look up the associated credentials stored in the computer-readable memory. If located, the application server further checks to ensure that the IP address from which the request for credentials originated matches the IP address associated with the ID token stored in the memory. If the information matches, the application server removes from memory the stored ID token, IP address, time stamp, and credentials, and sends the credentials to the application operating locally on the user's computer.

Having received the credentials, the application is authenticated. Advantageously, a secure link is established between the application and the application server such that the application may make multiple requests for data using the authenticated credentials without the need for the user to supply authenticating information for each request.

BRIEF DESCRIPTION OF THE FIGURES

The present invention will be more readily understood from the detailed description of the preferred embodiment(s) presented below considered in conjunction with the attached drawings, of which.

It is to be understood that the attached drawings are for purposes of illustrating the concepts of the invention and may not be to scale.

DETAILED DESCRIPTION OF THE INVENTION

The present invention relates to a method and a system for allowing a computer-executable application stored locally on a user's computer to transmit one or more requests for application data to an application server during a session, without having to re-authenticate the user for each request. Computer-executable applications or application files, collectively referred to as "applications," include, but are not limited to spreadsheet applications, such as Microsoft® Excel; word processing applications, such as Microsoft® Word or Corel WordPerfect®; database applications, such as Microsoft® Access; and presentation applications, such as Microsoft® PowerPoint. Although an exemplary description of the invention is presented in the context of a spreadsheet application, one skilled in the art will appreciate that the invention is not limited to any particular application, and that the invention applies to other types of applications known in the art.

The term "application data" is intended to include, but is not limited to, any information or data that may be used by, incorporated in, or embedded in an application. For example, application data may include logical expressions, equations, dates, numbers, characters, or any other information suitable for use by the application.

The term "computer" is intended to include any data processing device, such as a desktop computer, a laptop computer, a mainframe computer, a server, a personal digital assistant, or any other device able to process data.

The term "session" is generally defined as a lasting connection between a user's computer and another computer. Typically, the start of the session begins when the user connects with the other computer and ends when the connection is terminated. For example, a session may be a Web-based HTTP exchange between a browser operating on a user's computer and a computer running a Web server program (a "Web Server") or an application server.

Figure 1:
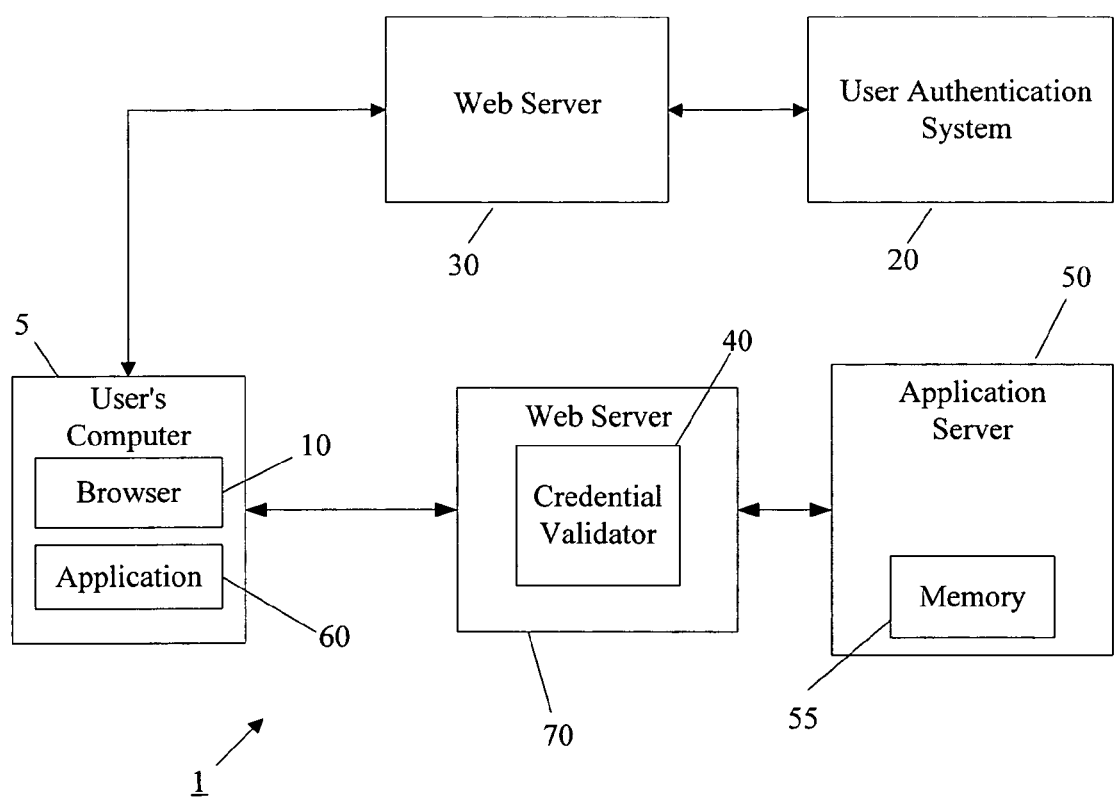
FIG. 1 is a schematic diagram of a system for providing a secure link between an application stored locally on a user computer and an application server, according to an embodiment of the present invention.

The manner in which the present invention provides a secure link between an application and an application server, such that the application may transmit one or more requests for application data to the application server during a session without having to re-authenticate each request, is described in detail with respect to FIG. 1. FIG. 1 illustrates an exemplary system 1 for providing access to an application and application data residing on an application server, referred to as an Application Server 50, which is protected by a communicatively connected credential validation system, referred to as a Credential Validator 40. Optionally, the Credential Validator 40 is part of a Web Server 70, which is a computer that serves as an interface between the Application Server 50 and a User's Computer 5. However, one of ordinary skill in the art will appreciate that alternative implementations may be used.

The term "communicatively connected" is intended to include any type of connection, whether wired or wireless, in which data may be communicated. The connection may be between devices within a single computer or between devices on separate computers.

The User's Computer 5 is communicatively connected to the Credential Validator 40 via, for example, any known Web-based network, such as the Internet. Preferably, the User's Computer 5 interfaces with the network via a Web browser 10 using, for example, any known Web-based protocol, including but not limited to HyperText Transmission Protocol ("HTTP") or HyperText Transmission Protocol, Secure ("HTTPS"). One having ordinary skill in the art will appreciate that any known Web browser may be used, including but not limited to Microsoft® Internet Explorer.

Each component of the system 1 depicted in FIG. 1 is represented on the network by a unique Uniform Resource Locator ("URL") which specifies the address or location of the component on the network. Using the Web browser 10, a user addresses his or her request to the URL of the Application Server 50, which maintains the services sought by the user. Although this embodiment of the invention is described in the context of using URLs to identify the locations of the components depicted in FIG. 1, one skilled in the art will appreciate that other addressing conventions may be used and that the invention is not limited to any one particular addressing convention.

The Credential Validator 40, communicatively connected between the User's Computer 5 and the Application Server 50, checks incoming communications received from the User's Computer 5 for valid user-authentication credentials, thus protecting the Application Server 50 from requests that do not include valid credentials. For this reason, the Application Server 50 provides what is referred to as a "protected Web service." The Credential Validator 40 may be any known credential validation system able to check and validate user-authentication credentials. Preferably, the Credential Validator 40 is an Apache ReverseProxy system.

In the event the Credential Validator 40 determines that the user has not been properly authenticated, the Credential Validator 40 redirects the user to a User Authentication System 20, which is communicatively connected to the User's Computer 5. Optionally, as shown in FIG. 1, a Web Server 30 may be communicatively connected between the User's Computer 5 and the User Authentication System 20 to allow the communication therebetween to use a Web-based protocol.

The User Authentication System 20 authenticates the user by verifying authentication information provided by the user. Typically, the authentication information includes, but is not limited to, a username and a passcode. Preferably, the User Authentication System 20 generates credentials that expire within a finite period, so that the credentials, once validated, cannot be used indefinitely. For example, the credentials may be time limited such that a session automatically terminates after passage of a fixed period of time. One of ordinary skill in the art will appreciate that any authentication system known in the art is suitable for use in the present invention. Preferably, the user authentication system is a single-sign-on system.

Upon authentication of the user, the User Authentication System 20 provides the user with the credentials for use during the session. Once the user has been properly authenticated, communications originating from the User's Computer 5 having these credentials will be validated by the Credential Validator 40 and forwarded to the Application Server 50.

The Application Server 50 may be a computer that stores and manages the services sought by the user. The Application Server 50 is further communicatively connected to a computer-readable memory, referred to as a Memory 55. The term "computer-readable memory" is intended to include any computer-accessible data storage device, whether volatile or nonvolatile, electronic, optical, or otherwise, including but not limited to floppy disks, hard disks, CD-ROMs, DVDs, flash memories, ROMs, and RAMs.

Although the Memory 55 is shown in FIG. 1 as residing on the Application Server 50, one of ordinary skill in the art will appreciate that the Memory 55 may be located remotely with respect to the Application Server 50. Further, one of ordinary skill in the art will appreciate that although the Credential Validator 40, the User Authentication System 20, the Application Server 50, and the Memory 55, are shown in FIG. 1 as physically distinct components, they may be located within a single computer or within different computers that are connected via a network.

The system 1 depicted in FIG. 1 allows the User's Computer 5 to submit one or more requests for services stored and managed by the Application Server 50 without having to re-authenticate each request according to the method described in detail below with respect to FIG. 2.

Figure 2:
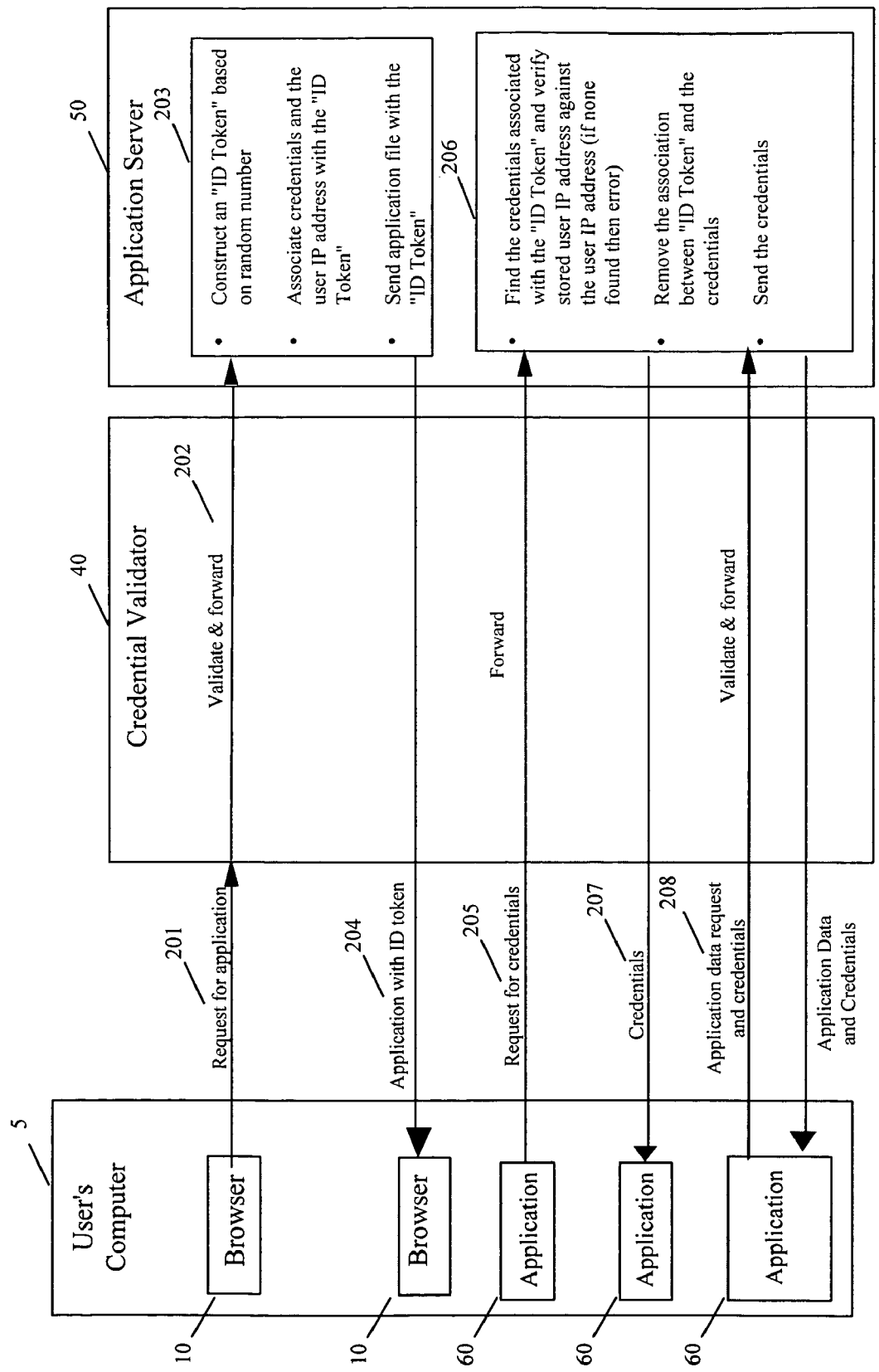
FIG. 2 is a schematic diagram of an application validation system, according to an embodiment of the present invention.

FIG. 2 provides a schematic depiction of the application authentication method and system according to the present invention. It is to be understood that the schematic representation of the system provided in FIG. 2 is exemplary in nature and alternative arrangements are within the scope of the present invention.

Referring to FIG. 2, in step 201, a request for an application is transmitted by the user from the User's Computer 5 to the Credit Validator 40. The application request may be transmitted with other request information including, but not limited to the user's IP address and a time stamp. The time stamp provides temporal information related to the session and/or request, which may include, for example, the time when the user initiated the current session and session/request expiration parameters. The Credential Validator 40 checks the application request for valid user-authentication credentials. In the event the Credential Validator 40 determines that the request does not include valid credentials, the Credential Validator 40 redirects the user to the User Authentication System 20, as described above.

In step 202, after validating the user's credentials, the Credential Validator 40 forwards the authenticated user's request, credentials, and request information to the Application Server 50. In step 203, upon receipt of the application request, request information, and credentials, the Application Server 50 performs a number of functions. First, for each application request received, the Application Server 50 creates a unique Identification (ID) Token. The ID token may be a numeric or alphanumeric identifier of any length, which may be randomly generated. Next, the Application Server 50 associates the credentials and the request information (IP address and time stamp) with the ID token and stores this association in the Memory 55. Optionally, this association may be stored in tabular form.

In step 204, the Application Server 50 associates the ID token with the requested application 60 and sends the ID token and the application 60 to the User's Computer 5. Preferably, the ID token is associated with the application 60 by changing the name of the file to the ID token. For example, if the application 60 is an Excel spreadsheet, the ID token may be associated with the spreadsheet by changing the spreadsheet name to "ID TOKEN.xls." Alternatively, the ID token may be associated with the application 60 by embedding the ID token in the application 60 itself. Other suitable methods of associating the ID token and the application 60 may be used according to the method and the system of the current invention.

Next, the application 60 is executed by the user. As used herein, the term "execute" refers to opening, downloading, detaching, saving, or any like operation known in the art. In step 205, upon execution, the application 60 is programmed to automatically extract the ID token and send the ID token back to the Application Server 50 as a request for credentials. The request for credentials includes the ID token extracted from the application 60 and the IP address of the User's Computer 5.

The request for credentials is received by the Credential Validator 40 and automatically forwarded to the Application Server 50. In step 206, the Application Server 50 looks up the credentials associated with the ID token sent with the request for credentials in the Memory 55. If found, the Application Server 50 verifies that the IP address from which the request for credentials originated matches the IP address associated with the ID token stored in the Memory 55. Optionally, the Application Server 50 checks the time stamp to ensure that the session has not expired. This time stamp check is intended to detect stale requests for credentials or stale data. The time stamp parameters may be customized according to individual system requirements.

In the event that either the ID token sent via the request for credentials is not found in the Memory 55, the IP addresses do not match, or the session time has expired, an error state is entered. The error state may include sending an error message back to the IP address from which the request originated.

In step 207, if the Application Server 50 successfully verifies the information as described above in connection with step 206, the credentials are sent to the User's Computer 5. By providing the credentials to the application 60, the application has been authenticated. Further, once the information is verified, the Application Server 50 removes the association between the ID token and the credentials from the Memory 55. This is done to protect against an unauthorized attempt to submit a repeat request for credentials.

Advantageously, matching the IP address in the request for credentials and the IP address stored in the Memory 55 prevents "sniffing," which is known in the art as an unauthorized learning of a valid ID Token and an attempted use of that ID token to engage in communications using the ID token from an unauthorized IP address. If the ID token has been sniffed, the Application Server 50 will detect, while matching the ID token stored in the Memory 55, that the ID token does not originate from the IP address associated with the ID token in the Memory 55. As such, the Application Server 50 will deny the corresponding request and enter the error state. In addition, comparing the IP addresses prevents access to application data by those persons who have not been validated but who receive the application 60 via email from a validated user.

Once the application 60 has been authenticated by receiving the validated credentials, the Application Server 50 views and treats the application 60 as it would a standard Web browser. This means that once the validated credentials are stored locally by the User's Computer 5, requests for application data may be submitted by the application 60 using the HTTPS protocol, by use of a cookie. In step 208, the Application Server 50 and the application 60 may now repeatedly interact with one another by passing the validated credentials back and forth as a cookie during data requests and responses. Each request from the application 60 includes the credentials and is validated by the Credential Validator 40 prior to forwarding onto the Application Server 50.

Preferably, the above described method and system may be used for any application that may be stored on a computer-accessible computer by one or more users via a Web-based network and that may be modified (i.e., operatively adjusted via code or logic added to the application) such that, upon execution, the application may extract the ID Token provided by the Application Server 50 and forward the extracted ID token to the Application Server 50.

Although the present invention has been described in considerable detail with reference to certain preferred embodiments and versions, other versions and embodiments are possible. Therefore, the scope of the appended claims are not limited to the description of the versions and embodiments expressly disclosed herein. The references and disclosure provided in the "Background of the Invention" section are not admitted to be prior art with respect to the disclosure provided in the current application.

What is claimed is:

1. A method for providing access to application data stored on a protected resource computer, the method comprising the steps of:
   - validating a request for an application received from a user computer wherein the request includes authenticated credentials and an IP address of the user computer;
   - generating an identification token for each validated request;
   - storing an association between the identification token, the credentials, and the IP address in a computer-readable memory communicatively connected to the protected resource computer;
   - sending the requested application and the identification token to the user computer, wherein the requested application is stored locally on the user computer;
   - receiving a request for credentials from the requested application stored locally on the user computer, wherein the request for credentials includes an identification token and an IP address, and wherein the request for credentials is generated upon execution of the requested application;
   - verifying that the identification token and the IP address received from the requested application match the identification token and the IP address stored in the computer-readable memory; and
   - sending the credentials to the requested application stored locally on the user computer, wherein the credentials allow the requested application to submit one or more requests for application data stored on the protected resource computer without requiring the user to input authentication information for each request.

2. The method of claim 1, wherein the requested application includes a Microsoft® Excel file.

3. The method of claim 1, wherein the requested application is sent to the user with the identification token embedded within the requested application.

4. The method of claim 1, wherein the requested application is sent to the user with the identification token provided as a filename of the requested application.

5. The method of claim 1, wherein the authenticated credentials are provided to the user computer by a user authentication system.

6. The method of claim 1, wherein the request for the application further includes a time stamp.

7. The method of claim 6, further comprising the step of using the time stamp to determine whether the request for the application has expired.

8. The method of claim 1, wherein the identification token is randomly generated.

9. The method of claim 1, wherein the association is removed from the computer-readable memory following verification of the identification token.

10. The method of claim 1, wherein the one or more requests for application data are submitted as a cookie.

11. A computer-implemented method for providing access to services stored on a protected resource computer, the method comprising the steps of:
   - validating a request for an application received from a user computer wherein the request includes authenticated credentials and an IP address of the user computer;
   - generating an identification token for each validated request;
   - storing an association between the identification token, the credentials, and the IP address in a computer-readable memory communicatively connected to the protected resource computer;
   - sending the requested application and the identification token to the user computer, wherein the requested application is stored locally on the user computer;
   - receiving a request for credentials from the requested application stored locally on the user computer, wherein the request for credentials includes an identification token and an IP address, and wherein the request for credentials is generated upon execution of the requested application;
   - verifying that the identification token and the IP address received from the requested application match the identification token and the IP address stored in the computer-readable memory; and
   - sending the credentials to the requested application stored locally on the user computer, wherein the credentials allow the requested application to submit one or more requests for application data stored on the protected resource computer without requiring the user to input authentication information for each request.

12. A system for providing access to application data stored on a protected resource computer, the system comprising:
   - a credential validator communicatively connected to a user computer, wherein the credential validator is configured to validate a request for an application received from the user computer, and wherein the request includes authenticated credentials and an IP address of the user computer; and
   - an application server communicatively connected to the credential validator, wherein the application server is configured to:
   - generate an identification token for each validated request,
   - store an association between the identification token, the credentials, and the IP address in a computer-readable memory communicatively connected to the application server,
   - send the requested application and the identification token to the user computer, wherein the requested application is stored locally on the user computer,
   - receive a request for credentials from the requested application stored locally on the user computer, wherein the request for credentials includes an identification token and an IP address, and wherein the request for credentials is generated upon execution of the requested application,
   - verify that the identification token and the IP address received from the requested application match the identification token and the IP address stored in the computer-readable memory, and
   - send the credentials to the requested application stored locally on the user computer, wherein the credentials allow the requested application to submit one or more requests for application data stored on the protected resource computer without requiring a user to input authentication information for each request.

13. The system of claim 12, wherein the requested application includes a Microsoft® Excel file.

14. The system of claim 12, wherein the requested application is sent to the user computer with the identification token embedded within the requested application.

15. The system of claim 12, wherein the requested application is sent to the user computer with the identification token provided as a filename of the requested application.

16. The system of claim 12, wherein the authenticated credentials are provided to the user computer by a user authentication system.

17. The system of claim 12, wherein the request for application further includes a time stamp.

18. The system of claim 17, wherein the time stamp is used to determine whether the request for the application has expired.

19. The system of claim 12, wherein the identification token is randomly generated.

20. The system of claim 12, wherein the association is removed from the memory following verification of the identification token.

21. The system of claim 12, wherein the one or more requests for application data are submitted as a cookie.

22. The system of claim 12, further comprising a user authentication system for providing the authenticated credentials.

23. The system of claim 12, wherein the user computer communicates with the credential validator using HyperText Transmission Protocol.

24. The system of claim 12, wherein the user computer communicates with the credential validator using HyperText Transmission Protocol, Secure.

25. A computer-readable storage medium storing computer code for providing access to application data stored on a protected resource computer, wherein the computer code comprises:

- code for validating a request for an application received from a user computer, wherein the request includes authenticated credentials and an IP address of the user computer;
- code for generating an identification token for each validated request;
- code for storing an association between the identification token, the credentials, and the IP address in a computer-readable memory communicatively connected to the protected resource computer;
- code for sending the requested application and the identification token to the user computer, wherein the requested application is stored locally on the user computer;
- code for receiving a request for credentials from the requested application stored locally on the user computer, wherein the request for credentials includes an identification token and an IP address, and wherein the request for credentials is generated upon execution of the requested application;
- code for verifying that the identification token and the IP address received from the requested application match the identification token and the IP address stored in the computer-readable memory; and
- code for sending the credentials to the requested application stored locally on the user computer,
- wherein the credentials allow the requested application to submit one or more requests for application data stored on the protected resource computer without requiring the user to input authentication information for each request.

* * * * *

UNITED STATES PATENT AND TRADEMARK OFFICE
CERTIFICATE OF CORRECTION

PATENT NO. : 7,665,127 B1 Page 1 of 1
APPLICATION NO. : 11/052677
DATED : February 16, 2010
INVENTOR(S) : Rao et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 941 days.

Signed and Sealed this

Seventh Day of December, 2010

David J. Kappos
*Director of the United States Patent and Trademark Office*